(12) United States Patent
Anantharaman et al.

(10) Patent No.: US 10,976,796 B2
(45) Date of Patent: Apr. 13, 2021

(54) DYNAMIC RANGE ENHANCEMENT FOR SELF-CAPACITANCE MEASUREMENT

(71) Applicant: QUALCOMM Incorporated, San Diego, CA (US)

(72) Inventors: Rajesh Anantharaman, Santa Clara, CA (US); Ajay Taparia, San Jose, CA (US); Shunxi Wang, Palo Alto, CA (US)

(73) Assignee: Qualcomm Incorporated, San Diego, CA (US)

( * ) Notice: Subject to any disclaimer, the term of this patent is extended or adjusted under 35 U.S.C. 154(b) by 113 days.

(21) Appl. No.: 16/040,025

(22) Filed: Jul. 19, 2018

(65) Prior Publication Data

US 2019/0034002 A1 Jan. 31, 2019

Related U.S. Application Data

(60) Provisional application No. 62/537,136, filed on Jul. 26, 2017.

(51) Int. Cl.
*G06F 3/044* (2006.01)
*G06F 3/041* (2006.01)
*G06F 3/047* (2006.01)
*G06F 1/32* (2019.01)

(52) U.S. Cl.
CPC ............ *G06F 1/32* (2013.01); *G06F 3/0446* (2019.05); *G06F 3/04182* (2019.05)

(58) Field of Classification Search
CPC combination set(s) only.
See application file for complete search history.

(56) References Cited

U.S. PATENT DOCUMENTS

| | | | | |
|---|---|---|---|---|
| 8,610,443 | B1* | 12/2013 | Ryshtun | G06F 3/04182 324/683 |
| 9,430,105 | B2* | 8/2016 | Yao | G06F 3/04182 |
| 9,665,215 | B2* | 5/2017 | Tan | G06F 3/044 |
| 2012/0218020 | A1* | 8/2012 | Erdogan | G06F 3/04166 327/337 |
| 2012/0256869 | A1* | 10/2012 | Walsh | G06F 3/0418 345/174 |
| 2013/0162586 | A1* | 6/2013 | Erdogan | G06F 3/044 345/174 |
| 2013/0278538 | A1* | 10/2013 | Brunet | H03K 17/9622 345/174 |
| 2013/0285971 | A1* | 10/2013 | Elias | G06F 3/0418 345/174 |

(Continued)

OTHER PUBLICATIONS

Partial International Search Report—PCT/US2018/043140—ISA/EPO—dated Oct. 11, 2018.

(Continued)

*Primary Examiner* — Patrick N Edouard
*Assistant Examiner* — Peijie Shen
(74) *Attorney, Agent, or Firm* — Loza & Loza LLP

(57) ABSTRACT

Aspects of the disclosure are directed to self-capacitance measurement and cancellation. In accordance with one aspect, a self-capacitance cancellation circuit includes an input amplifier, wherein the input amplifier comprises a non-inverting input, an inverting input and an output; a coherent current source coupled to the inverting input; a feedback network coupled to the output; and a capacitance coupled to the inverting input.

30 Claims, 8 Drawing Sheets

$$V_o = A\sin\omega t \left(1 + \frac{Cself - GCanc}{Cf}\right)$$

(56) References Cited

U.S. PATENT DOCUMENTS

| | | | | |
|---|---|---|---|---|
| 2014/0043279 | A1* | 2/2014 | Pedersen | G06F 3/0446 345/174 |
| 2014/0152328 | A1* | 6/2014 | Erdogan | G06F 3/04166 324/679 |
| 2014/0210491 | A1* | 7/2014 | Jonsson | G06F 3/04164 324/661 |
| 2014/0292705 | A1* | 10/2014 | Tan | G06F 3/044 345/174 |
| 2014/0327644 | A1* | 11/2014 | Mohindra | G06F 3/04182 345/174 |
| 2015/0035787 | A1* | 2/2015 | Shahparnia | G06F 3/0418 345/174 |
| 2015/0212650 | A1* | 7/2015 | Noto | G01R 35/005 345/174 |
| 2015/0227232 | A1* | 8/2015 | Yao | G06F 3/0445 345/174 |
| 2015/0331535 | A1* | 11/2015 | Li | G06F 3/0445 348/174 |
| 2015/0355775 | A1* | 12/2015 | Myren | G06F 3/0416 345/174 |
| 2016/0054829 | A1* | 2/2016 | Ellis | G06F 3/04166 345/178 |
| 2016/0091999 | A1* | 3/2016 | Dattalo | G06F 3/0443 345/174 |
| 2016/0127523 | A1* | 5/2016 | Rouaissia | H04B 5/0012 455/566 |
| 2016/0188041 | A1* | 6/2016 | Kim | G06F 3/04182 345/174 |
| 2016/0216836 | A1* | 7/2016 | Yao | G06F 3/041661 |
| 2016/0283023 | A1* | 9/2016 | Shin | G06F 3/0412 |
| 2017/0139539 | A1* | 5/2017 | Yao | G06F 3/0418 |
| 2018/0275823 | A1* | 9/2018 | Lim | G06F 3/0418 |
| 2018/0329573 | A1* | 11/2018 | Liu | G06F 3/0446 |
| 2018/0364841 | A1* | 12/2018 | Shahparnia | G06F 1/3262 |
| 2019/0294297 | A1* | 9/2019 | Sasai | G06F 3/044 |
| 2019/0310725 | A1* | 10/2019 | McIntyre | G06F 3/044 |

OTHER PUBLICATIONS

International Search Report and Written Opinion—PCT/US2018/043140—ISA/EPO—Jan. 3, 2019.

\* cited by examiner

DYNAMIC RANGE ENHANCEMENT FOR SELF-CAPACITANCE MEASUREMENT

CROSS-REFERENCE TO RELATED APPLICATION(S)

This application claims priority to and the benefit of U.S. Provisional Patent Application No. 62/537,136, filed on Jul. 26, 2017, the entire content of which is incorporated herein by reference as if fully set forth below in its entirety and for all applicable purposes.

TECHNICAL FIELD

This disclosure relates generally to the field of self-capacitance, and, in particular, to dynamic range enhancement for self-capacitance measurement.

BACKGROUND

The self-capacitance of an electronic product may need an accurate measurement for improved electrical performance. Existing measurement solutions may have a restricted dynamic range which results in inaccurate self-capacitance measurements. The present disclosure enhances the dynamic range for self-capacitance measurement for an electronic product such as, but not limited to, a touchscreen.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides self-capacitance measurement and cancellation. Accordingly, a self-capacitance cancellation circuit, including an input amplifier, wherein the input amplifier includes a non-inverting input, an inverting input and an output; a coherent current source coupled to the inverting input; a feedback network coupled to the output; and a capacitance coupled to the inverting input. In one example, the feedback network includes a feedback resistor Rf and a feedback capacitor Cf. In one example, the feedback resistor Rf maintains stability of the input amplifier. In one example, the capacitance includes a self-capacitance Cs coupled in parallel to a parasitic capacitance Cp.

In one example, the self-capacitance cancellation circuit further includes a coherent signal, wherein the coherent signal directly drives the non-inverting input, and the coherent signal is coherent with the coherent current source. In one example, the coherent signal indirectly drives the inverting input. In one example, the coherent signal includes of a first coherent signal and a second coherent signal. In one example, the first coherent signal directly drives the non-inverting input and the second coherent signal indirectly drives the inverting input. In one example, the first coherent signal is generated by a first physical signal source and the second coherent signal is generated by a second physical signal source, wherein the second physical signal source is phase locked to the first physical signal source. In one example, the self-capacitance cancellation circuit further includes a driver, wherein the driver drives the coherent current source.

Another aspect of the disclosure provides a method for self-capacitance cancellation, the method including generating a coherent signal and applying the coherent signal to a non-inverting input of an input amplifier and to a cancellation capacitor; generating a first coherent current from a first current source, wherein the first current source is coupled to the cancellation capacitor; generating a second coherent current from a second current source, wherein the second coherent current equals the first coherent current; setting a gain factor such that the product of the gain factor and a capacitance of the cancellation capacitor equals a self-capacitance of a self-capacitor; and generating a third coherent current from a third current source and applying the third coherent current to an inverting input of the input amplifier and the self-capacitor, wherein the third coherent current equals the product of the second coherent current times the gain factor.

In one example, the first coherent current is coherent to the coherent signal. In one example, the second coherent current is coherent to the coherent signal. In one example, the third coherent current is coherent to the coherent signal. In one example, the first coherent current, the second coherent current and the third coherent current are each coherent to the coherent signal. In one example, the cancellation capacitor is connected to an inverting input of a voltage-to-current converting amplifier. In one example, the voltage-to-current converting amplifier includes an operational amplifier and a metal oxide semiconductor (MOS) transistor.

In one example, the method further includes using an oscillator to generate the coherent signal. In one example, the method further includes coupling the first current source and the second current source through a transistor. In one example, the transistor is a metal oxide semiconductor (MOS) transistor. In one example, the method further includes using the gain factor for monitoring an output voltage of the input amplifier to detect a touch on a touch screen.

Another aspect of the disclosure provides an apparatus for self-capacitance cancellation, the apparatus including means for generating a coherent signal and for applying the coherent signal to a non-inverting input of an input amplifier and to a cancellation capacitor; means for generating a first coherent current from a first current source, wherein the first current source is coupled to the cancellation capacitor; means for generating a second coherent current from a second current source, wherein the second coherent current equals the first coherent current; means for setting a gain factor such that the product of the gain factor and a capacitance of the cancellation capacitor equals a self-capacitance of a self-capacitor; and means for generating a third coherent current from a third current source and for applying the third coherent current to an inverting input of the input amplifier and the self-capacitor, wherein the third coherent current equals the product of the second coherent current times the gain factor.

In one example, the apparatus further includes means for using the gain factor for monitoring an output voltage of the input amplifier to detect a touch on a touch screen. In one example, at least one of the first coherent current, the second coherent current or the third coherent current is coherent to the coherent signal. In one example, the apparatus further includes means for generating the coherent signal. In one example, the apparatus further includes means for coupling the first current source and the second current source.

Another aspect of the disclosure provides a computer-readable medium storing computer executable code, operable on a device including at least one processor and at least one memory coupled to the at least one processor, wherein the at least one processor is configured to implement self-capacitance cancellation, the computer executable code including instructions for causing a computer to generate a coherent signal and to apply the coherent signal to a non-inverting input of an input amplifier and to a cancellation capacitor; instructions for causing the computer to generate a first coherent current from a first current source, wherein the first current source is coupled to the cancellation capacitor; instructions for causing the computer to generate a second coherent current from a second current source, wherein the second coherent current equals the first coherent current; instructions for causing the computer to set a gain factor such that the product of the gain factor and a capacitance of the cancellation capacitor equals a self-capacitance of a self-capacitor; and instructions for causing the computer to generate a third coherent current from a third current source and to apply the third coherent current to an inverting input of the input amplifier and the self-capacitor, wherein the third coherent current equals the product of the second coherent current times the gain factor.

In one example, the computer-readable medium further includes instructions for causing the computer to use the gain factor for monitoring an output voltage of the input amplifier to detect a touch on a touch screen. In one example, the computer-readable medium further includes instructions for causing the computer to generate the coherent signal. In one example, the computer-readable medium further includes instructions for causing the computer to couple the first current source and the second current source through a transistor.

These and other aspects of the invention will become more fully understood upon a review of the detailed description, which follows. Other aspects, features, and implementations of the present invention will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Many electronic products have self-capacitance as part of their design characteristics. Self-capacitance is a fundamental physical property which quantifies the ability to store electric energy. That is, the higher the self-capacitance, the higher the amount of electric charge being stored for a given electric potential (i.e., voltage). In particular, a touchscreen, along with a touch display driver interface (TDDI), fingerprint sensors, and human interface sensors (where an electrical signal is detected), etc. are examples of an electronic product which include self-capacitance. The self-capacitance of an electronic product may need to be measured accurately to improve performance. However, existing solutions have limited dynamic range and may not be able to obtain accurate self-capacitance measurements. In one example, dynamic range is the difference between the maximum possible measurement and the minimum possible measurement. As described herein, the present disclosure provides for enhancing the dynamic range for self-capacitance measurement for an electronic product such as, but not limited to, a touchscreen. Also, the present disclosure allows for embedded displays to have a lower power mode.

Figure 1:
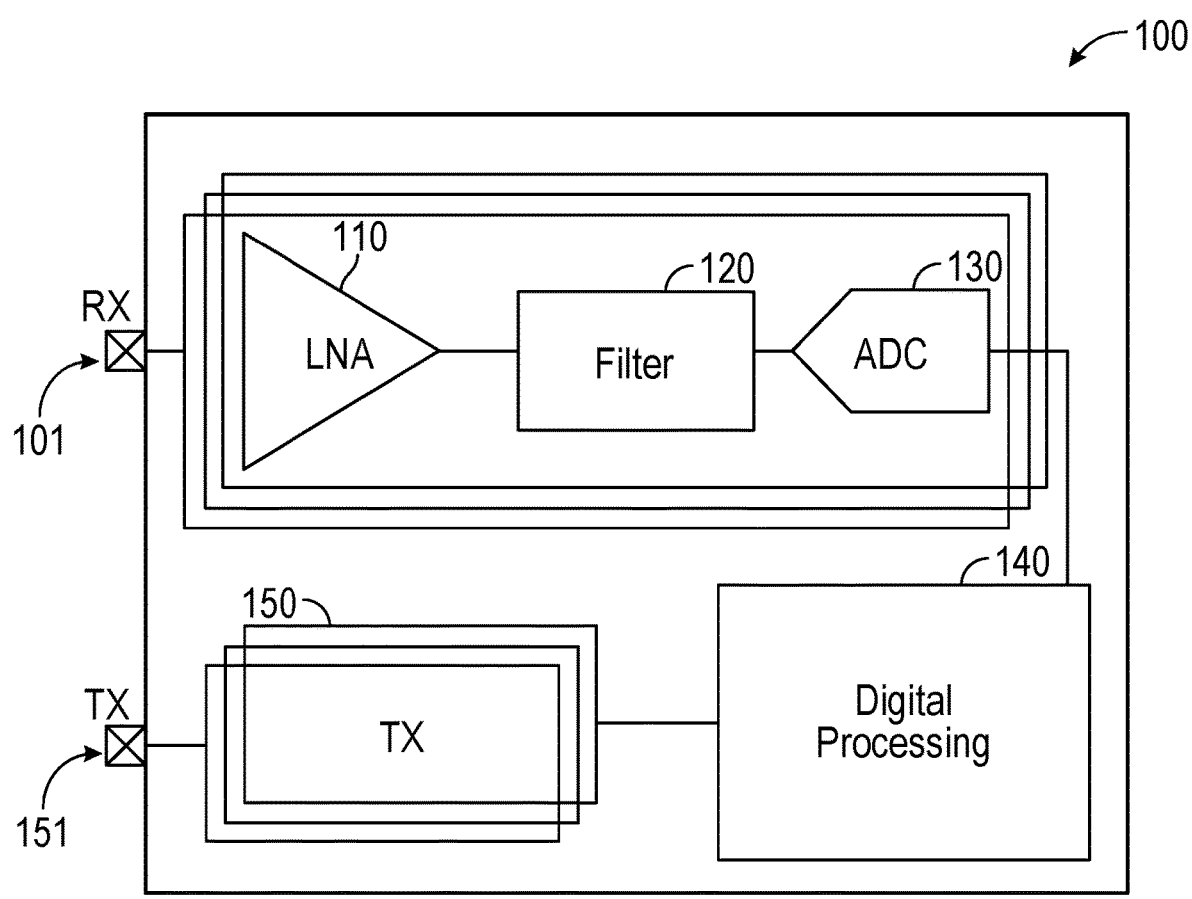
FIG. 1 illustrates an example system block diagram for a touchscreen interface module with a receive input and a transmit output.

FIG. 1 illustrates an example system block diagram 100 for a touchscreen interface module with a receive input 101 and a transmit output 151. A known signal generated at digital processing block 140, is driven into a touch sensor (not shown) by transmitter 150. A transmit signal interacts with the touch sensor to generate an electrical signal picked by receiver input 101. The receive input 101 is coupled to a low noise amplifier (LNA) 110, a filter 120, an analog to digital converter (ADC) 130, digital processing block 140, and transmitter (TX) 150, which is coupled to the transmit output 151. In one example, an input signal from the receive input 101 is amplified by the LNA 110 and filtered by filter 120 to remove noise component(s) before being digitized by the ADC 130 and processed by the digital processing block 140 to produce a processed signal. The processed signal is sent out the transmit output 151 after manipulation by the transmitter 150.

Figure 2:
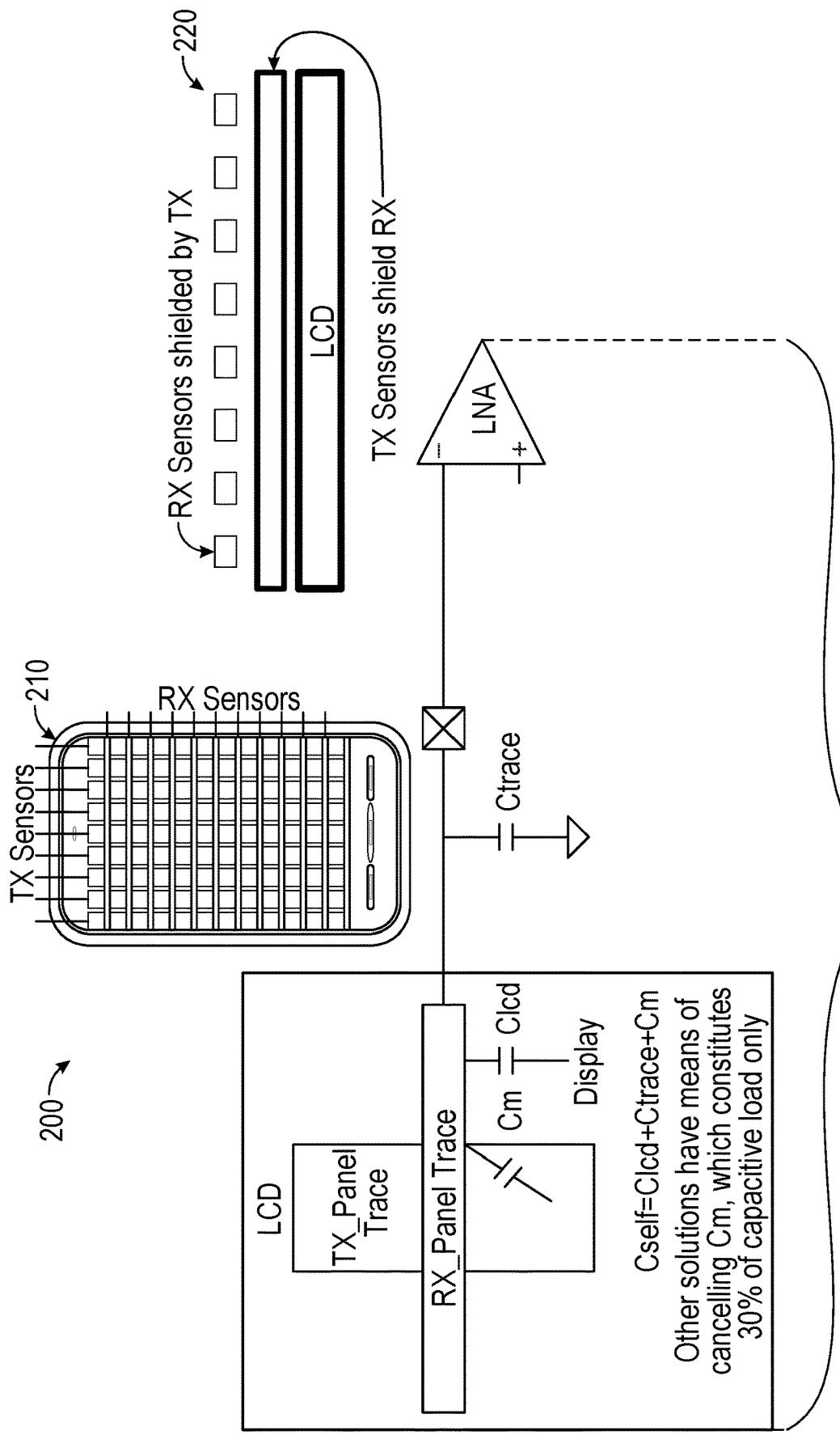
FIG. 2 illustrates an example touchscreen interface module model.

FIG. 2 illustrates an example touchscreen interface module model 200. Shown is an example touchscreen interface module 210 with transmit sensors and receive sensors. In one example, the transmit sensors and receive sensors are arranged as a rectangular array. Also shown is a side view 220 of the example touchscreen interface module 210 showing receive sensors 221 as an upper layer, transmit sensors 222 as a middle layer and a liquid crystal display (LCD) 223 as a lower layer. In one example, the transmit sensors 222 shield the receive sensors 221 from display noise. Also shown is an electric schematic diagram 230 of the example touchscreen interface module 210. The electric schematic diagram 230 shows a LCD 231 with a receive panel trace 232 and a transmit panel trace 233 and a mutual capacitance Cm 234 between the receive panel trace 232 and the transmit panel trace 233. In addition, there is a parasitic capacitance Clcd 235 between the receive panel trace 232 and a display 236. The routing capacitance from the sensor input to the chip is denoted as Ctrace 237. In one example, the LNA 238 shown in FIG. 2 is the LNA 110 shown in FIG. 1.

In one example, the self-capacitance Cself of the touchscreen interface module 210 includes the summation of the mutual capacitance Cm 234, the parasitic capacitance Clcd 235 and the routing capacitance Ctrace 237 such that:

$$Cself = Cm + Clcd + Ctrace.$$

Some prior art solutions have provided ways for cancelling the mutual capacitance Cm 234 which constitutes only a fraction of the self-capacitance Cself. However, the present disclosure may achieve cancellation of most or even the entire self-capacitance Cself to result in a higher dynamic range.

Figure 3:
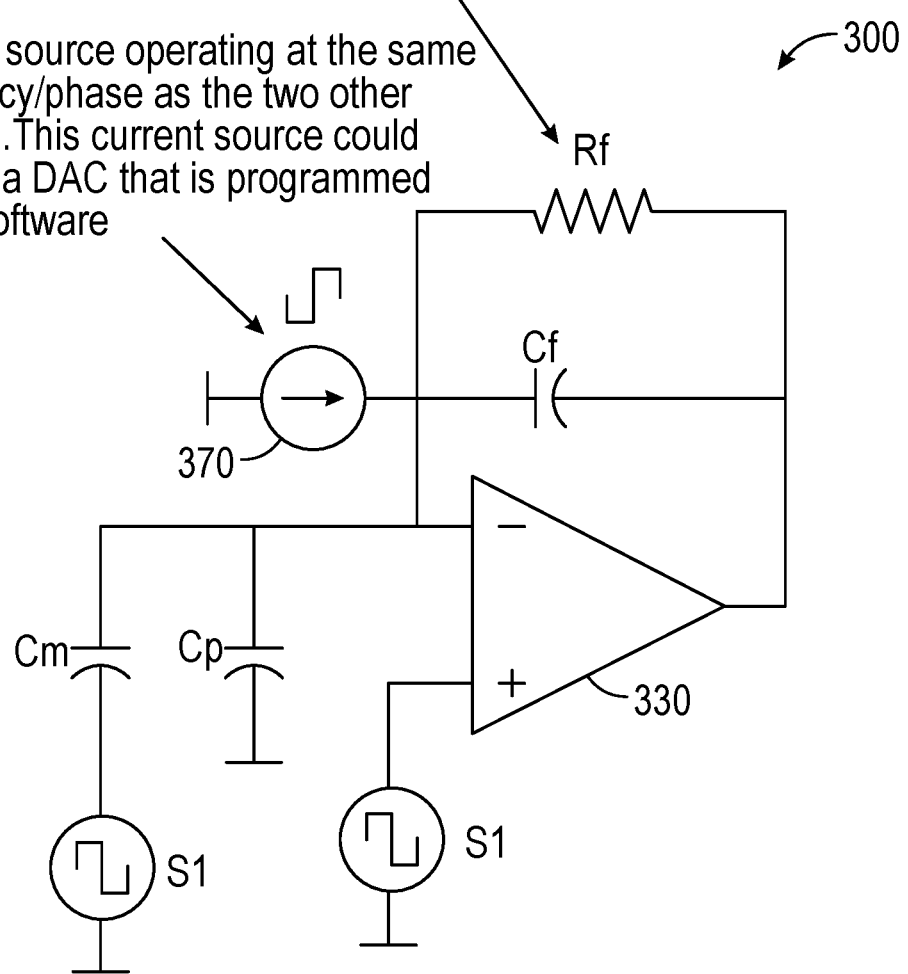
FIG. 3 illustrates a first example of a self-capacitance cancellation circuit.

FIG. 3 illustrates a first example of a self-capacitance cancellation circuit 300. For example, in the self-capacitance cancellation circuit 300, an input amplifier 330 has a non-inverting input directly driven by a first coherent signal S1 and an inverting input indirectly driven by a second coherent signal S1 coupled through a mutual-capacitance Cm 340 and with a parallel parasitic capacitance Cp 350. In one example, the first coherent signal S1 directly driving the non-inverting input and the second coherent signal S1 indirectly driving the inverting input are from the same physical signal source. In another example, the first coherent signal S1 directly driving the non-inverting input and the second coherent signal S1 indirectly driving the inverting input are from two physical signal sources where a first of the two physical signal sources is phase locked to a second of the two physical signal sources.

The input amplifier 330 has an output which is sent as an input to a feedback network which includes a feedback resistor Rf 331 and a feedback capacitor Cf 332. In one example, the feedback resistor Rf 331 is added to maintain stability of the input amplifier 330. The feedback network has an output which is coupled to the inverting input of the input amplifier 330. In the self-capacitance cancellation circuit 300, the first coherent signal S1 also drives a coherent current source 370 which is fed to the inverting input of the input amplifier 330. In one example, the coherent current source 370 may be a sine wave signal with a known frequency and a known phase. In an example, the coherent current source 370 may be implemented by a digital to analog converter (DAC) which may be programmable either by firmware or software.

Figure 4:
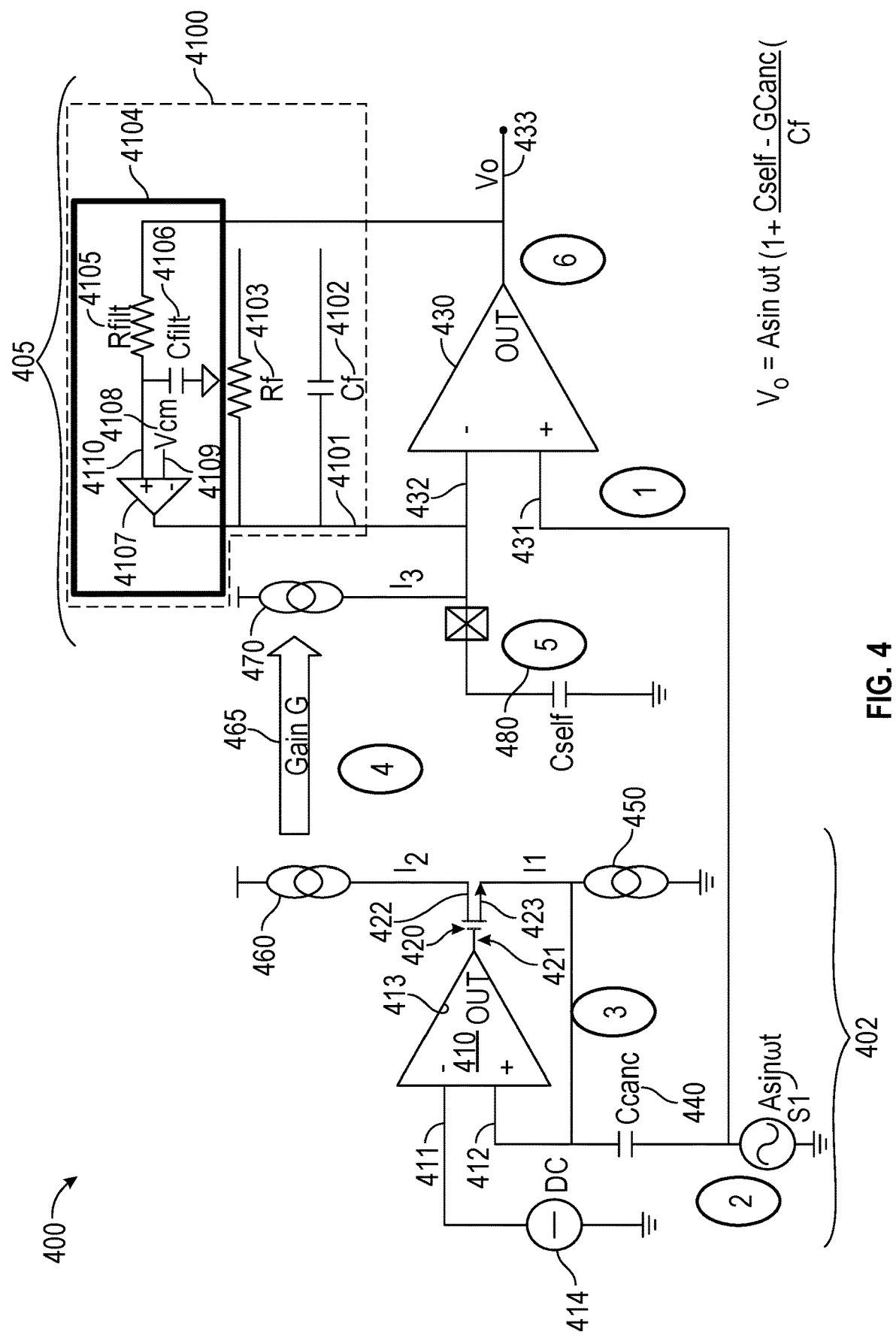
FIG. 4 illustrates an example of a self-capacitance cancellation circuit with a current source with a self-capacitance current generated using a cancellation capacitor Ccanc and a voltage-to-current converting amplifier.

FIG. 4 illustrates an example of a self-capacitance cancellation circuit 405 with a current source (i.e., a third current source 470) with a self-capacitance current generated using a cancellation capacitor Ccanc 440 and a voltage-to-current converting amplifier (e.g., operational amplifier 410 and metal oxide semiconductor (MOS) transistor 420). Shown in the example of FIG. 4, a driver 402 includes at least the following components: a DC source 414, an operational amplifier 410, a cancellation capacitor Ccanc 440, a first current source 450, a second current source 460, a MOS transistor 420, and a coherent signal S1.

An operational amplifier 410 includes a first non-inverting input 411 and a first inverting input 412 and a first output 413 which is coupled to a gate terminal 421 of a MOS transistor 420. In one example, the first non-inverting input 411 is connected to a DC source 414. An input amplifier 430 includes a second non-inverting input 431 and a second inverting input 432 and a second output (Vo) 433 which is an output of the self-capacitance cancellation circuit 405. In one example, the input amplifier 430 is a low noise amplifier (LNA).

In one example, a coherent signal S1 (e.g., A sin ωt) may be applied to the second non-inverting input 431 of the input amplifier 430. In one example, the coherent signal S1 may be a sine wave signal with a known frequency and a known phase. In one example, the known phase has a non-zero phase offset relative to another signal. In another example, the coherent signal S1 may also be applied to a cancellation capacitor Ccanc 440 connected to the first inverting input 412 of the operational amplifier 410. For example, the operational amplifier 410 and the MOS transistor 420 generate a first coherent current $I_1$ at a source terminal 423 of the MOS transistor 420. For example, a first portion of the first coherent current $I_1$ is fed back to the first inverting input 412 of the operational amplifier 410. In one example, the first portion of the first coherent current $I_1$ is inverted by the operational amplifier 410. In another example, a second portion of the first coherent current $I_1$ is sunk by a first current source 450. In one example, the first current source 450 produces a fixed current for loop stability and enables a faithful reproduction of coherent signal S1.

Next, a second current source 460 supplies a second coherent current $I_2$ to a drain terminal 422 of the MOS transistor 420. In one example, the second coherent current $I_2$ equals the first coherent current $I_1$. The second current source 460 may be coupled to a third current source 470 via a gain factor G 465 to generate a third coherent current $I_3$. In one example, the third coherent current $I_3$ is related to the second coherent current $I_2$ by the current gain factor G (i.e., $I_3 = G*I_2$). In one example, the coupling between the second current source 460 and the third current source 470 may be implemented by a current mirror. In one example, a portion of the third coherent current $I_3$ charges a self-capacitor 480 with a self-capacitance Cself.

In one example, the third current source 470 provides a charge source for the self-capacitor 480, instead of the operational amplifier 410. As a result, the second output 433 of the input amplifier 430 does not react to the coherent signal S1 which improves the dynamic range of the self-capacitance cancellation circuit 405. For example, the self-capacitance cancellation circuit 405 improves signal response to touch and improves external noise sensitivity of the touchscreen.

In addition, the second output 433 of the input amplifier 430 may be fed back to a feedback network 4100 with a feedback output 4101 sent to the second inverting input 432 of the input amplifier 430. In one example, the feedback network 4100 includes a feedback capacitor Cf 4102, a feedback resistor Rf 4103 and a common mode voltage compensation circuit 4104. In one example, the common mode voltage compensation circuit 4104 includes a low pass filter resistor Rfilt 4105, a low pass filter capacitor Cfilt 4106 and a low pass filter amplifier 4107 with a common mode voltage Vcm 4108 sent to a third inverting input 4109 of the low pass filter amplifier 4107. Also, the output of the low pass filter resistor Rfilt 4105 is sent to a third non-inverting input 4110 of the low pass filter amplifier 4107. In one example, the common mode voltage compensation circuit 4104 maintains the common-mode voltage of the second output 433 at the input amplifier 430. In one example, the feedback resistor Rf 4103 is inserted to improve stability of the feedback network 4100.

In one example, a transfer function H of the self-capacitance cancellation circuit 405 from the coherent signal S1 to the second output (Vo) 433 of the input amplifier 430 is $$H = Vo/S1 = 1 + (Cself - G*Ccanc)/Cf.$$

In one example, the current gain factor G may be selected to scale the cancellation capacitor Ccanc 440 appropriately to cancel the self-capacitance Cself (from the self-capacitor 480) such that the transfer function H=Vo/S1 of the self-capacitance cancellation circuit 405 is approximately unity. In one example, the current gain factor G may be selected to scale the cancellation capacitor Ccanc 440 to equal Cself+Cf to cancel the entire coherent signal S1 at the second output 433, leaving the full dynamic range at second output 433 to respond to a change in self capacitor Cself. In one example, Vo is the second output 433 (shown in FIG. 4) and S1 is A sin ωt as specified in the equation shown in FIG. 4. In this manner, the dynamic range of the self-capacitance cancellation circuit 405 is enhanced.

Six stages are shown in FIG. 4. In stage 1 (labeled by a circled numeral 1), a known coherent signal (e.g., S1) at a known frequency and known phase is applied at the non-inverting node (i.e., the second non-inverting input 431) of the input amplifier 430. In stage 2 (labeled by a circled numeral 2), the coherent signal (e.g., S1) is applied to the cancellation capacitor Ccanc 440. In stage 3 (labeled by a circled numeral 3), a sinusoidal current (e.g., the first coherent current $I_1$ at the source terminal 423 of the MOS transistor 420) is generated, which is inverted using the operational amplifier 410. In stage 4 (labeled by a circled numeral 4), a gain factor G 465 is applied and inputted to the inverting terminal of the LNA 430. That is, the inverting terminal is the second inverting input 432 and the LNA is the input amplifier 430.

In stage 5 (labeled by a circled numeral 5), instead of the operational amplifier 410 providing the charge, a current source (e.g., the third current source 470) provides the charge required by the self-capacitor 480. And, in stage 6 (labeled by a circled numeral 6), the operational amplifier 410 is prevented from reacting to the coherent signal S1 (e.g., A sin ωt). As a result, the dynamic range of the of the self-capacitance cancellation circuit 405 is enhanced which in turn improves signal response to touch and external noise headroom. Also, the enhanced dynamic range results in improved water rejection, whereby presence of water on the touchscreen is better detected due to increased signal to noise ratio (SNR). For example, a touchscreen code change (i.e., signal level transition) may be magnified with the increased dynamic range. In one example, the self-capacitance cancellation circuit 405 includes known coherent signal (e.g., S1) which may directly drive the second non-inverting input 431 of the input amplifier 430 and the third current source 470 which drives the second inverting input 432 of the input amplifier 430, wherein the third current source 470 is coherent to the known coherent signal S1.

Figure 5:
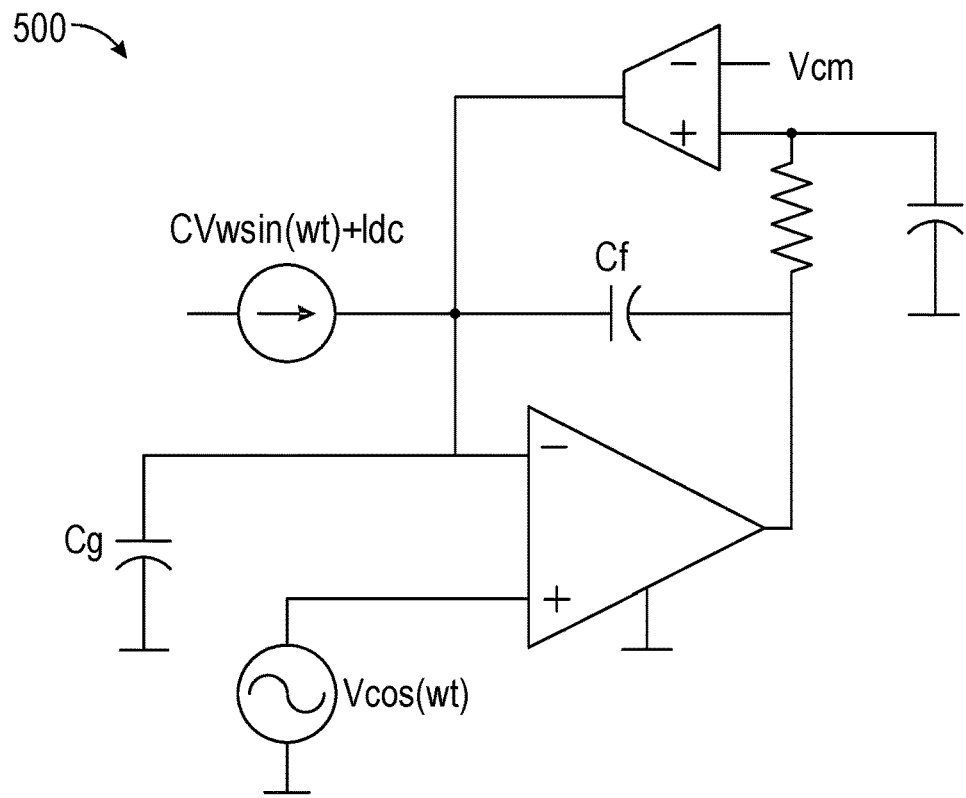
FIG. 5 illustrates a second example of a self-capacitance cancellation circuit.

FIG. 5 illustrates a second example of a self-capacitance cancellation circuit 500. In self-capacitance cancellation circuit 500, a coherent current source is fed into an inverting input of an input amplifier to cancel a self-capacitance.

Figure 6:
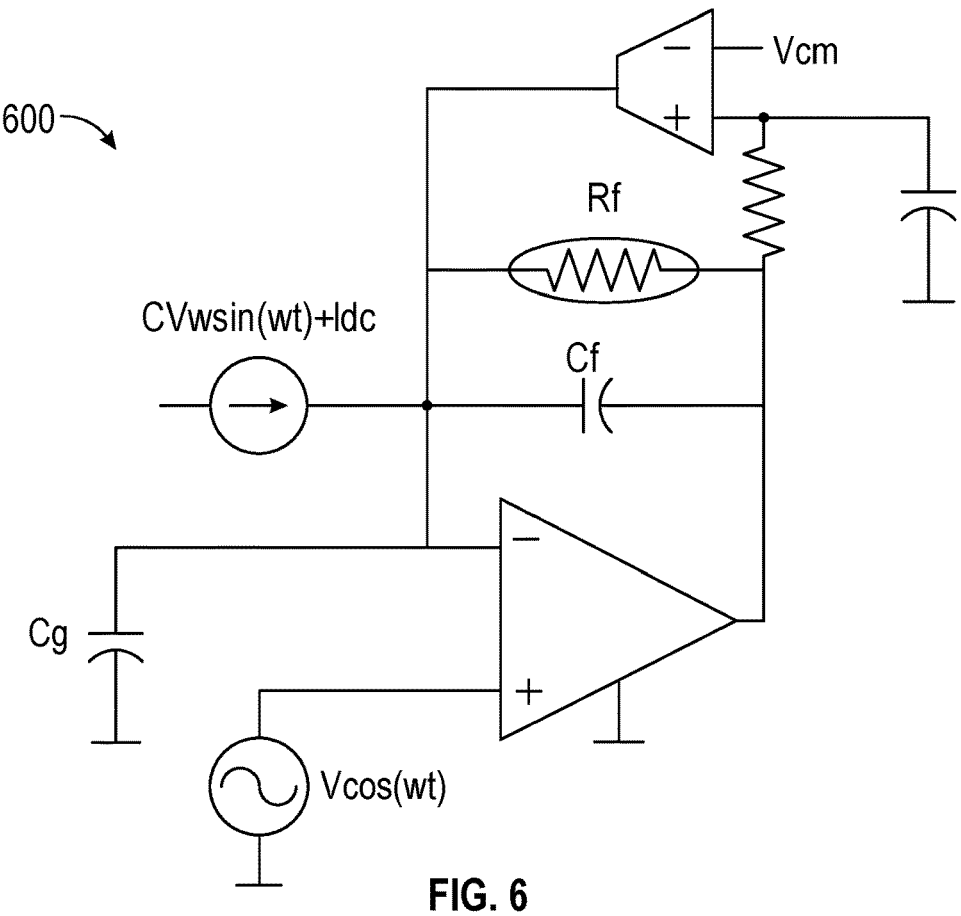
FIG. 6 illustrates a third example of a self-capacitance cancellation circuit.

FIG. 6 illustrates a third example of a self-capacitance cancellation circuit 600. In the self-capacitance cancellation circuit 600, a coherent current source is fed into an inverting input of an input amplifier to cancel a self-capacitance and a feedback resistor Rf is added to a feedback network to improve phase margin.

Figure 7:
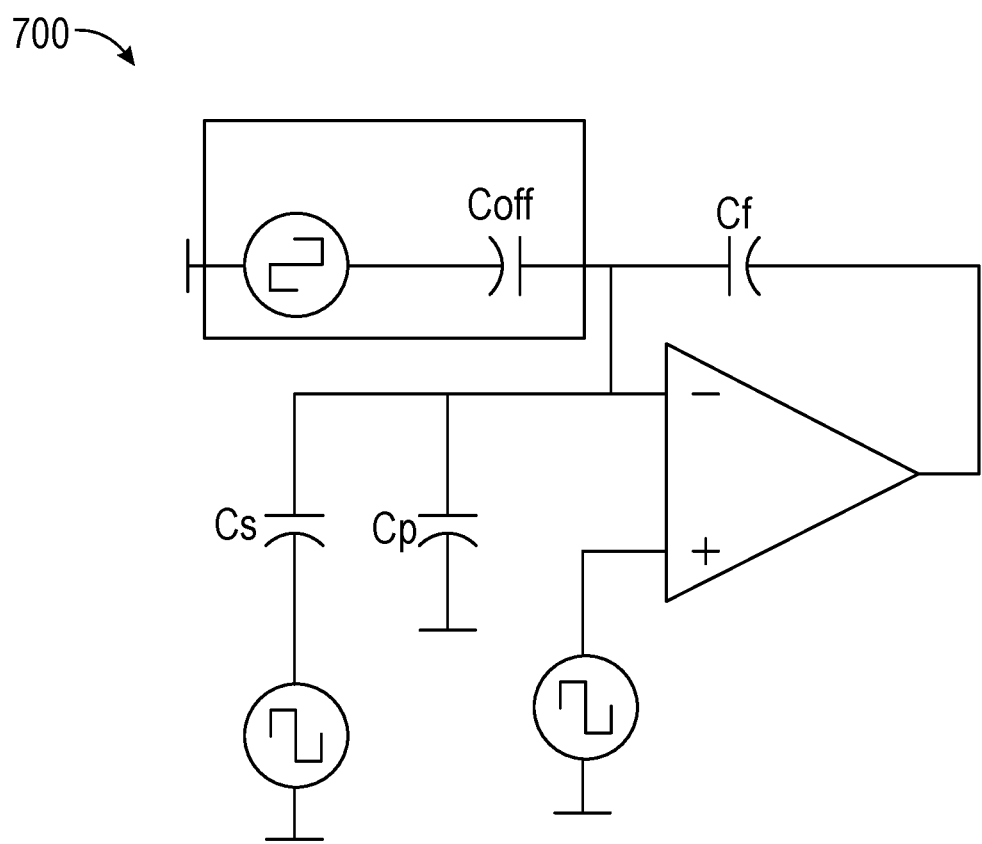
FIG. 7 illustrates a fourth example of a self-capacitance cancellation circuit.

FIG. 7 illustrates a fourth example of a self-capacitance cancellation circuit 700. In the self-capacitance cancellation circuit 700, a coherent voltage source, rather than a coherent current source, is applied to an offset capacitor Coff coupled to an inverting input of an input amplifier. In one example, the offset capacitor Coff may be programmable.

Figure 8:
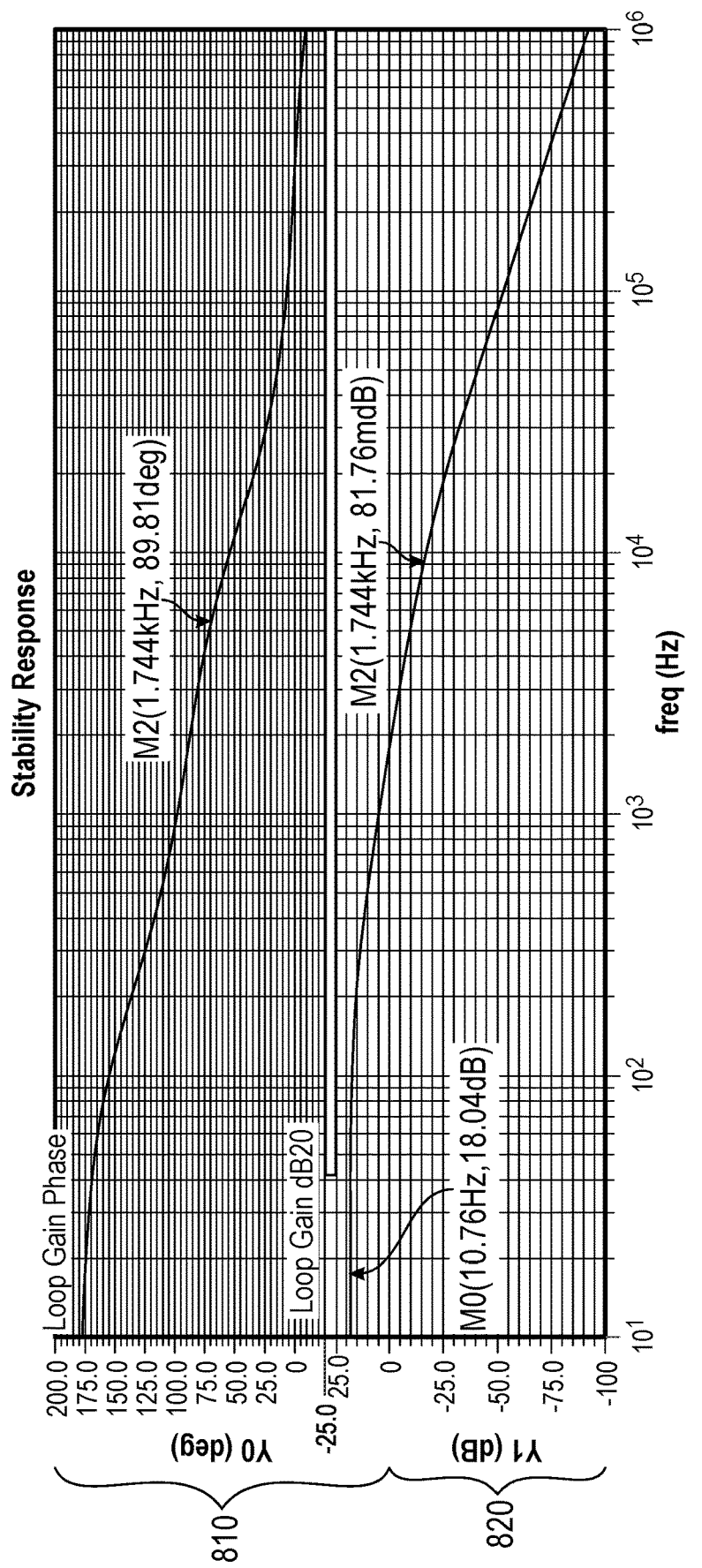
FIG. 8 illustrates an example of a phase response vs. frequency graph and an example of a magnitude response vs. frequency graph for a self-capacitance cancellation circuit in accordance with the present disclosure.

FIG. 8 illustrates an example of a phase response vs. frequency graph 810 and an example of a magnitude response vs. frequency graph 820 for a self-capacitance cancellation circuit in accordance with the present disclosure. In one example, the phase response and the magnitude response portray the frequency response of a circuit (i.e., how the output relates to the input as a function of frequency). In one example, stability of the self-capacitance cancellation circuit may be quantified by a phase margin. For example, the phase margin is defined by the value of the phase response at a unity gain frequency, where the unity gain frequency is defined as the frequency where the magnitude response is unity (i.e., 0 dB). For example, FIG. 8 shows that the unity gain frequency is approximately 1.744 kHz and the phase margin at the unity gain frequency is 89.81 degrees. In one example, the phase margin should be greater than 45 degrees to ensure stability. Thus, in this example, the self-capacitance cancellation circuit is stable.

Figure 9:
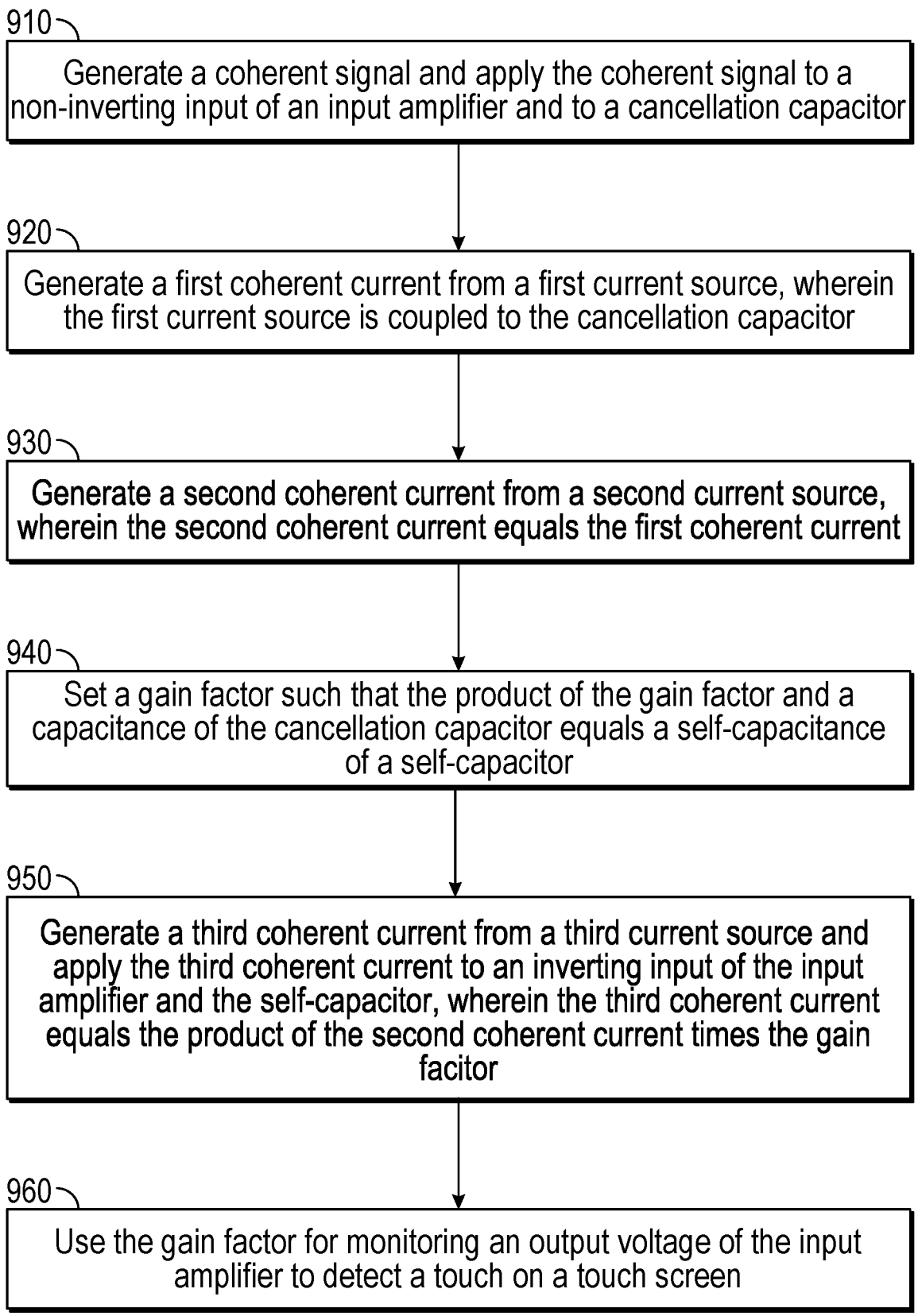
FIG. 9 illustrates an example flow diagram for self-capacitance cancellation.

FIG. 9 illustrates an example flow diagram 900 for self-capacitance cancellation. In block 910, generate a coherent signal (e.g., coherent signal S1 shown in FIG. 4) and apply the coherent signal to a non-inverting input (e.g., a second non-inverting input 431) of an input amplifier (e.g., input amplifier 430) and to a cancellation capacitor (e.g., cancellation capacitor Ccanc 440). In one example, the cancellation capacitor is connected to an inverting input of a voltage-to-current converting amplifier (e.g., operational amplifier 410 and MOS transistor 420). In one example, an oscillator is used to generate the coherent signal.

In block 920, generate a first coherent current (e.g., first coherent current $I_1$ shown in FIG. 4) from a first current source (e.g., first current source 450), wherein the first current source is coupled to the cancellation capacitor. In one example, the first coherent current is generated from an output of the voltage-to-current amplifier. In one example, the first coherent current is coherent to the coherent signal.

In block 930, generate a second coherent current (e.g., second coherent current $I_2$ shown in FIG. 4) from a second current source (e.g., second current source 460), wherein the second coherent current equals the first coherent current. In one example, a coupling between the first current source and the second current source is through a transistor (e.g., MOS transistor 420). In one example, the second coherent current is coherent to the coherent signal.

In block 940, set a gain factor such that the product of the gain factor and a capacitance of the cancellation capacitor equals a self-capacitance of a self-capacitor (e.g., self-capacitor 480). In one example, a processor (not shown) is used to set the gain factor. The processor may be coupled to a memory unit.

In block 950, generate a third coherent current (e.g., third coherent current $I_3$ shown in FIG. 4) from a third current source (e.g., third current source 470) and apply the third coherent current to an inverting input (e.g., second inverting input 432) of the input amplifier and the self-capacitor, wherein the third coherent current equals the product of the second coherent current times the gain factor. In one example, the third coherent current is coherent to the coherent signal. In one example, the first coherent current and the second coherent current are each coherent to the coherent signal. In one example, the first coherent current, the second coherent current and the third coherent current are each coherent to the coherent signal.

In block 960, use the gain factor for monitoring an output voltage (e.g., second output (Vo) 433) of the input amplifier to detect a touch on a touch screen. In one example, a processor (not shown) is used to monitor the output voltage to detect the touch on the touch screen. The processor may be coupled to a memory unit. In one example, the processor used in the step of block 960 is the same as the processor used in the step of block 940. In another example, separate processors are used in the steps of block 940 and 960.

Accordingly, the present disclosure, in one example, discloses a self-capacitance cancellation circuit, including: an input amplifier, wherein the input amplifier includes a non-inverting input, an inverting input and an output; a coherent current source coupled to the inverting input; a feedback network coupled to the output; and a capacitance coupled to the inverting input. In one example, the feedback network includes a feedback resistor Rf and a feedback capacitor Cf, wherein the feedback resistor Rf maintains stability of the input amplifier. In one example, the capacitance includes a self-capacitance Cs coupled in parallel to a parasitic capacitance Cp.

In one example, the self-capacitance cancellation circuit further includes a coherent signal, wherein the coherent signal directly drives the non-inverting input, and the coherent signal is coherent with the coherent current source. For example, the coherent signal indirectly drives the inverting input, and the coherent signal includes a first coherent signal and a second coherent signal. In one example, the first coherent signal directly drives the non-inverting input and the second coherent signal indirectly drives the inverting input. For example, the first coherent signal is generated by a first physical signal source and the second coherent signal is generated by a second physical signal source, wherein the second physical signal source is phase locked to the first physical signal source. The self-capacitance cancellation circuit may further include a driver, wherein the driver drives the coherent current source.

In one aspect, one or more of the steps for providing self-capacitance measurement and cancellation in FIG. 9 may be executed by one or more processors which may include hardware, software, firmware, etc. In one aspect, one or more of the steps in FIG. 9 may be executed by one or more processors which may include hardware, software, firmware, etc. The one or more processors, for example, may be used to execute software or firmware needed to perform the steps in the flow diagram of FIG. 9. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for self-capacitance measurement and cancellation. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A self-capacitance cancellation circuit, comprising:
   an input amplifier, wherein the input amplifier comprises a non-inverting input, an inverting input and an output;
   a current source coupled to the inverting input, wherein the current source is a fixed sine wave signal with a known frequency and a known phase with a non-zero phase offset relative to a driver coherent signal and wherein the current source generates a first current equal to a product of a gain factor and a second current;
   a feedback network coupled to the output;
   a capacitor coupled to the inverting input; and
   wherein a product of the gain factor and a capacitance of a cancellation capacitor equals a self-capacitance of the capacitor.

2. The self-capacitance cancellation circuit of claim 1, wherein the feedback network comprises a feedback resistor Rf and a feedback capacitor Cf.

3. The self-capacitance cancellation circuit of claim 2, wherein the feedback resistor Rf maintains stability of the input amplifier.

4. The self-capacitance cancellation circuit of claim 1, wherein the capacitance comprises a self-capacitance Cs coupled in parallel to a parasitic capacitance Cp.

5. The self-capacitance cancellation circuit of claim 4, wherein the signal from the driver directly drives the non-inverting input, and the signal from the driver has the non-zero phase offset relative to the current source.

6. The self-capacitance cancellation circuit of claim 5, wherein the signal from the driver indirectly drives the inverting input.

7. The self-capacitance cancellation circuit of claim 6, wherein the signal from the driver comprises of a first signal and a second signal.

8. The self-capacitance cancellation circuit of claim 7, wherein the first signal directly drives the non-inverting input and the second signal indirectly drives the inverting input.

9. The self-capacitance cancellation circuit of claim 8, wherein the first signal is generated by a first physical signal source and the second signal is generated by a second physical signal source, wherein the second physical signal source is phase locked to the first physical signal source.

10. The self-capacitance cancellation circuit of claim 1, wherein the driver drives the current source.

11. A method for self-capacitance cancellation, the method comprising:
    generating a fixed sine wave signal with a known frequency and a known phase and applying the fixed sine wave signal to a non-inverting input of an input amplifier and to a cancellation capacitor;
    generating a first current from a first current source, wherein the first current source is coupled to the cancellation capacitor;
    generating a second current from a second current source, wherein the second current equals the first current;
    setting a gain factor such that a product of the gain factor and a capacitance of the cancellation capacitor equals a self-capacitance of a capacitor; and
    generating a third current from a third current source and applying the third current directly to an inverting input of the input amplifier and the capacitor, wherein the third current equals a product of the second current times the gain factor.

12. The method of claim 11, wherein the first current has a first non-zero phase offset relative to the fixed sine wave signal.

13. The method of claim 11, wherein the second current has a second non-zero phase offset relative to the fixed sine wave signal.

14. The method of claim 11, wherein the third current has a third non-zero phase offset relative to the fixed sine wave signal.

15. The method of claim 11, wherein the first current, the second current and the third current have non-zero phase offsets relative to the fixed sine wave signal.

16. The method of claim 11, wherein the cancellation capacitor is connected to an inverting input of a voltage-to-current converting amplifier.

17. The method of claim 16, wherein the voltage-to-current converting amplifier comprises an operational amplifier and a metal oxide semiconductor (MOS) transistor.

18. The method of claim 11, further comprising using an oscillator to generate the fixed sine wave signal.

19. The method of claim 18, further comprising coupling the first current source and the second current source through a transistor.

20. The method of claim 19, wherein the transistor is a metal oxide semiconductor (MOS) transistor.

21. The method of claim 19, further comprising using the gain factor for monitoring an output voltage of the input amplifier to detect a touch on a touch screen.

22. An apparatus for self-capacitance cancellation, the apparatus comprising:
- means for generating a fixed sine wave signal with a known frequency and a known phase and for applying the fixed sine wave signal to a non-inverting input of an input amplifier and to a cancellation capacitor;
- means for generating a first current from a first current source, wherein the first current source is coupled to the cancellation capacitor;
- means for generating a second current from a second current source, wherein the second current equals the first current;
- means for setting a gain factor such that a product of the gain factor and a capacitance of the cancellation capacitor equals a self-capacitance of a capacitor; and
- means for generating a third current from a third current source and for applying the third current directly to an inverting input of the input amplifier and the capacitor, wherein the third current equals a product of the second current times the gain factor.

23. The apparatus of claim 22, further comprising means for using the gain factor for monitoring an output voltage of the input amplifier to detect a touch on a touch screen.

24. The apparatus of claim 23, wherein at least one of the first current, the second current or the third current has a non-zero phase offset relative to the fixed sine wave signal.

25. The apparatus of claim 24, further comprising means for generating the fixed sine wave signal.

26. The apparatus of claim 25, further comprising means for coupling the first current source and the second current source.

27. A computer-readable medium storing computer executable code, operable on a device comprising at least one processor and at least one memory coupled to the at least one processor, wherein the at least one processor is configured to implement self-capacitance cancellation, the computer executable code comprising:
- instructions for causing a computer to generate a fixed sine wave signal with a known frequency and a known phase and to apply the fixed sine wave signal to a non-inverting input of an input amplifier and to a cancellation capacitor;
- instructions for causing the computer to generate a first current from a first current source, wherein the first current source is coupled to the cancellation capacitor;
- instructions for causing the computer to generate a second current from a second current source, wherein the second current equals the first current;
- instructions for causing the computer to set a gain factor such that the product of the gain factor and a capacitance of the cancellation capacitor equals a self-capacitance of a capacitor; and
- instructions for causing the computer to generate a third current from a third current source and to apply the third current directly to an inverting input of the input amplifier and the capacitor, wherein the third current equals the product of the second current times the gain factor.

28. The computer-readable medium of claim 27, further comprising instructions for causing the computer to use the gain factor for monitoring an output voltage of the input amplifier to detect a touch on a touch screen.

29. The computer-readable medium of claim 28, further comprising instructions for causing the computer to generate the fixed sine wave signal.

30. The computer-readable medium of claim 29, further comprising instructions for causing the computer to couple the first current source and the second current source through a transistor.

* * * * *